(12) United States Patent
Gogitidze

(10) Patent No.: US 12,512,474 B2
(45) Date of Patent: Dec. 30, 2025

(54) CATHODE MATERIAL

(71) Applicant: Zurab Davidovych Gogitidze, Kiev (UA)

(72) Inventor: Zurab Davidovych Gogitidze, Kiev (UA)

( * ) Notice: Subject to any disclaimer, the term of this patent is extended or adjusted under 35 U.S.C. 154(b) by 733 days.

(21) Appl. No.: 17/757,655

(22) PCT Filed: Jul. 31, 2020

(86) PCT No.: PCT/UA2020/000074
§ 371 (c)(1),
(2) Date: Jun. 17, 2022

(87) PCT Pub. No.: WO2021/080548
PCT Pub. Date: Apr. 29, 2021

(65) Prior Publication Data
US 2023/0025311 A1    Jan. 26, 2023

(30) Foreign Application Priority Data

Oct. 21, 2019 (UA) .............................. a2019 10462
Oct. 21, 2019 (UA) .............................. u2019 10463

(51) Int. Cl.
| | |
|---|---|
| *H01M 4/60* | (2006.01) |
| *H01G 11/32* | (2013.01) |
| *H01G 11/48* | (2013.01) |
| *H01M 4/62* | (2006.01) |
| *H01M 4/02* | (2006.01) |

(52) U.S. Cl.
CPC ........... *H01M 4/602* (2013.01); *H01G 11/32* (2013.01); *H01G 11/48* (2013.01); *H01M 4/623* (2013.01); *H01M 4/625* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2008/0248354 | A1* | 10/2008 | Kubo | .............. C12Q 1/004 429/458 |
| 2009/0176159 | A1* | 7/2009 | Zhamu | .............. H01M 4/505 429/231.95 |
| 2012/0107690 | A1* | 5/2012 | Wakizaka | .............. H01M 4/13 252/500 |

(Continued)

FOREIGN PATENT DOCUMENTS

| | | |
|---|---|---|
| WO | 2006083069 A1 | 8/2006 |
| WO | 2015107519 A1 | 7/2015 |

OTHER PUBLICATIONS

Written Opinion International Search Report for PCT/UA2020/000074 dated Nov. 11, 2020.

(Continued)

*Primary Examiner* — Nicholas A Smith
*Assistant Examiner* — Zackary Richard Cochenour
(74) *Attorney, Agent, or Firm* — Wuersch & Gering LLP

(57) ABSTRACT

The cathode material contains the active component, the conductive component and the connecting component. Organic biomaterial is used as the active component, acetylene carbon black is used as the conductive component and polyvinylidene fluoride is used as the connecting component.

19 Claims, 1 Drawing Sheet

(56) References Cited

U.S. PATENT DOCUMENTS

Figure 1:
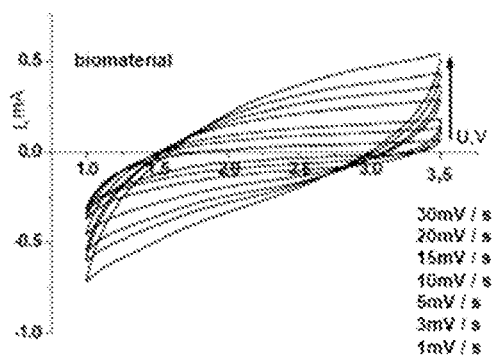

2019/0109358 A1    4/2019  Chai et al.
2019/0379039 A1*  12/2019  Zhamu .................. H01M 4/133

OTHER PUBLICATIONS

International Search Report (Form 210) for PCT/UA2020/000074 dated Nov. 11, 2020.
Beker P et al., "Bioinspired Nanostructural Peptide Materials for Supercapacitor Electrodes" Journal of Materials Research Jan. 31, 2011, vol. 25, pp. 1661-1666 (abstract).

* cited by examiner

CATHODE MATERIAL

The invention relates to the field of electrical engineering, namely cathode materials, which are a mixture of active, conductive and binder components and can be used in the manufacture of current sources and/or energy storage devices, including high-power batteries, capacitors, and hybrid supercapacitors that can be used to store energy and to power portable electronics, power tools, electric vehicles, and more.

Lithium-ion (Li-ion) batteries with active cathode material based on complex oxides $LiCoO_2$, $LiMn_2O_4$, $LiCo_{1/3}Ni_{1/3}Mn_{1/3}O_2$ are known. There are several common ways to obtain such materials, such as the methods described in U.S. Pat. Nos. 5,135,732 and 4,246,253. The main disadvantages of such cathode materials are structure distortion and adverse reactions during the cycling of the battery, which-leads to irreversible loss of capacity.

Also known is a method of forming cathodes for lithium current sources according Ukraine Patent No. UA 112896 published-Nov. 10, 2016, which includes the manufacture of a cathode composition by mixing mesoporous maghemite (iron oxide $\gamma$-$Fe_2O_3$), acetylene black, polyvinylidene fluoride, and a solvent of for the cathode by applying the cathode composition to aluminum foil followed by drying, wherein the cathode composition has the following components (wt. %):

| | |
|---|---|
| mesoporous maghemite | 60-80 |
| acetylene black | 10-30 |
| polyvinylidene fluoride | sufficient quantity to make 100 |

Despite certain advantages, the cathode material obtained by the above method has the disadvantage of low electronic conductivity of the material obtained, as well as power loss with increasing number of the discharge cycle.

In recent years, the attention of inventors is increasingly attracted to organic materials for use as active components of cathode materials for chemical current sources, in particular for high-energy chemical current sources. There is a method of obtaining a cathode material for lithium current sources based on hydrolysis of lignin according to Russian Federation Patent No. RU 2482571, date of publication May 20, 2013. It is necessary to note the large number of stages and the length of the cathode material manufacturing process, as well as the relatively low practical energy intensity of lithium-based lithium current sources (up to 650 W h/kg).

There is also known the method of obtaining a cathode material for chemical current sources according to Russian Federation Patent No. RU 2597607, date of publication Sep. 10, 2016, which includes processing by fluorination of wood containing carbon, using pre-grinding, drying, sealing, creating pressure of not more than 0.1 $kg/cm^2$, filling with a mixture of fluorine gas with nitrogen, and fluorination with continuous stirring until the reaction is complete. The resulting thermally stable product (up to 300° C.) has a theoretical energy content of 4.5 kW h/kg and a specific electronic conductivity of $1 \times 10^{-11}$ Sm/cm. The disadvantages are the low energy intensity, the low electronic conductivity and, as a consequence, the low discharge currents of the chemical current source.

The object of the invention disclosed herein is to provide a cathode material for permanent and/or renewable current and/or energy storage units with high specific capacitance values, the ability to store high discharge and charge capacities with a large number of discharge/charge cycles.

The problem is solved by a cathode material containing the active component, the conductive component and the coupling component, wherein the active component is organic biomaterial, the conductive component is acetylene carbon black, and the coupling component is polyvinylidene fluoride, in the following amounts (wt. %):

| | |
|---|---|
| organic biomaterial | 40-85 |
| acetylene black | 15-35 |
| polyvinylidene fluoride | sufficient quantity to make 100 | wherein the organic biomaterial comprises (wt. %):

| | |
|---|---|
| peptides of plant or animal origin and | 0.1-50 |
| NaCl and $K_2HPO_4$ in equal proportions | sufficient quantity to make 100 |

The claimed cathode material can be used not only with a lithium anode, but also with an anode of any suitable metal or any alloy thereof. The prerequisite for the use of biomaterials, such as peptides of plant or animal origin, as an active component of cathodes is that they carry a charge and have high conductivity.

It has been unexpectedly found that the use of peptides with a molecular weight in the range from 1 to 150 kDa, and having a primary sequence containing from 2 to 200 amino acids, significantly increases the electrical conductivity of the material. This fact is explained by that these small active peptides act at very small (nano- and pico-) concentrations, and small molecules more easily transport positively charged ions of suitable metal between the positive and negative electrodes in the discharge and charge process. Due to this, during the discharge of the current source, a complex chemical compound is produced, rather than separate simple compounds and elements, such as pure carbon. This, in turn, prevents unwanted sediment from depositing on the surface of the cathode material. As a rule, the anode material does not participate in these processes, so there are no problems with electrode restoration, which provides stability and safety when using the battery.

Research has shown that the use of organic biomaterials as the basis of a cathode composition significantly increases the specific energy characteristics of current sources. The results of these studies have not only confirmed the effectiveness of the use of organic biomaterials as the active component of the cathode material, but also several times exceeded the performance of the known best samples of batteries and hybrid supercapacitors. In the course of the study of the new cathode material, unusual effects and regularities were discovered which, by their very nature, had never been encountered in similar current sources before.

Unexpectedly, a feature was invented, which the inventors called the "relaxation recovery effect" of the cathode material, the essence of which is the ability of a rechargeable battery or supercapacitor to recover a specific capacity without connecting to external sources of energy. That is, the process of the "relaxation recovery effect" is somewhat similar to the process of charging a current source, but proceeds more smoothly and is slower. This effect can be very interesting for building prototypes of self-renewing electrochemical power sources. From the viewpoint of the inventors, the nature of this effect may lie in the properties of the active peptide component of the organic biological material and may be associated with the restoration of the structure of the active component after removal of the load. In any case, the operating parameters of current sources based on the following principles of restorative work can significantly exceed the corresponding characteristics of traditional current sources. Additional studies have shown that using the relaxation recovery mode (effect) results in a significant increase in the final discharge capacity of current sources compared to a conventional galvanostatic discharge, with the final discharge capacity of current sources increasing without wasting energy.

Also, during the study of the cathode material were found periodic "relaxation" leaps potential when used as a cathode material composite material consisting of organic biomaterial and as the second component of the nanosized composite $SiO_2$ and $Al_2O_3$, mixed mechanically in a ratio of 1:1. It should be noted the value of the specific discharge capacity, which reached the value of 4000-mA h/g, is a very high value of the capacity. According to the inventors, the effect of "relaxation" leaps of potential recorded in the galvanostatic mode is the result of the combined action of charge transfer between composite particles with different conductivity. In particular, since $SiO_2$ and $Al_2O_3$ are characterized by low conductivity and peptide material, according to literature, is a material with high conductivity, a local charge accumulation at discharge is possible at the contact points of different particles, which will be reflected as a "relaxation" jump of potential. That is, as a result of studies of the cathode material using organic biomaterials as the active component, a fixed effect is discovered, which opens a new non-classical mechanism for the operation of current sources.

Figure 2:
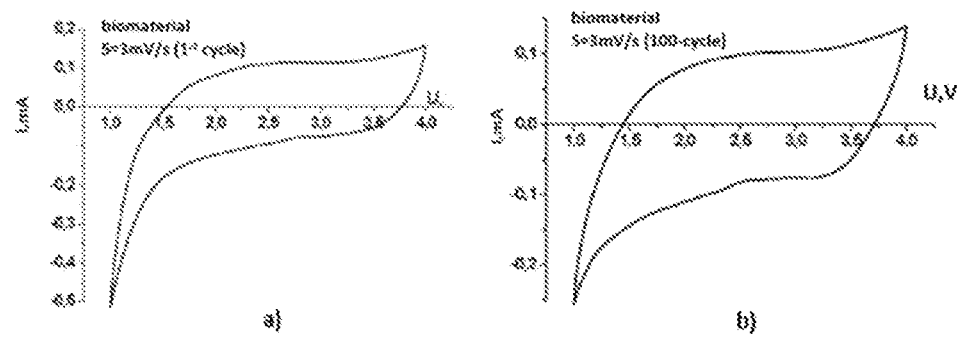
Figure 3:
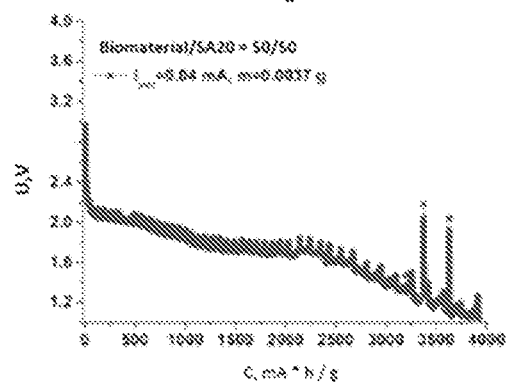

The following drawings- and examples of specific implementation of the cathode material, are provided to explain the invention disclosed herein and are not intended to limit the scope-thereof:

FIG. 1—CVA curves of current sources (biomaterial) at different speeds of potential change;

FIG. 2—CVA curves of current sources (biomaterial) obtained at the rate of change of potential S=3 mV/s: a) 1st cycle, c) 100th cycle FIG. 3—The discharge curve of the cathode based on biomaterial/composite $SiO_2$ and $Al_2O_3$ (galvanostatic mode).

The experimental studies used cathode material having the following ratio of major components (wt. %): Organic biomaterials-40-85, acetylene black-15-35, polyvinylidene fluoride-sufficient quantity to make 100. The ranges of each of the components of the organic biomaterial were determined experimentally.

Example 1. The composition of the cathode material includes: biomaterial—77%, acetylene carbon black—18%, polyvinylidene fluoride—5%. All components were mechanically mixed at ambient room temperature under normal conditions. The resulting paste mixture was applied to the substrate and dried for 72 hours (at 55° C.).

Three types of substrates were used: carbon tablet, aluminum foil and non-woven polypropylene. A sealed layout of the two-electrode cell was created. Lithium metal was used as the anode, and a 1 M solution of $LiBF_4$ in γ-butyrolactone as the electrolyte. Testing of the operational parameters of the test models was carried out in galvanostatic and potentiodynamic modes (charge/discharge at the Tionit stand) at room temperature (25° C.). To determine the type (kinetics) of electrochemical reactions, cyclic voltammetry (CVA) was performed. Since the rates of electrochemical reactions for different materials differ, a certain range of velocity sweeps of potential S was tested, with corresponding curves being obtained and analyzed. The created layout of the current source (based on biological material) with a carbonic substrate was investigated in the voltage range 1-3.5 V using the velocity sweep potential S=1, 3, 5, 10, 15, 20, 30 mV/s. The study gave CVA curve having a substantially rectangular shape (with no pronounced peaks on the charge and discharge branches) (FIG. 1), which indicates the capacitive accumulation of charge on the cathode as a result of the formation of a double electric layer, which clearly indicates a direct connection of the process of charge accumulation with the formation of a double electric layer on the surface of the peptide component of the biological material. Based on the CVA curves obtained, the capacities of the charge and discharge processes of the current source (biological material) and the Coulomb efficiency are calculated, as shown in Table 1.

TABLE 1

| No | S, mV/s | C (discharge), mA * h/g | C (charge), mA * h/g | Q, % |
|---|---|---|---|---|
| 1 | 1 | 932 | 1269 | 73.4 |
| 2 | 3 | 1035 | 1044 | 99.1 |
| 3 | 5 | 886 | 922 | 96.1 |
| 4 | 10 | 633 | 675 | 93.8 |
| 5 | 15 | 525 | 557 | 94.3 |
| 6 | 20 | 460 | 493 | 93.3 |
| 7 | 30 | 354 | 386 | 91.7 |

It is noted that the specific capacitances of the discharge and charge decrease exponentially as the scanning speed increases. The obtained values of the specific capacitance of the discharge and charge at low speeds are high enough for the operation of the current source in the cyclic voltammetry mode. The maximum Coulomb efficiency corresponds to a scan rate of 3 mV/s and is approximately 99% when charge is accumulated by forming a double electric layer.

Example 2. To determine the storage capacity during the charge/discharge cycles cathode material similar to Example 1 was used. 100 cycles of charge/discharge in the potential-dynamic mode at a rate of change of potential of 3 mV/s in a potential window of 1.0-4.0 V were performed. The curves for the 1st and $100^{th}$ charge/discharge cycles are shown separately in FIGS. 2 (a, b). The calculated charge and discharge capacities for the 1st and 100th cycles are presented in Table 2. As a result, it is found that after 100 cycles of charge/discharge, the current source (biological material) does not lose its ability to operate in charge/discharge mode. The degree of degradation (capacitive attenuation) on the 100th cycle compared to the first cycle is about 12%.

TABLE 2

| No | S, mV/s | C (discharge), mA * h/g | C (charge), mA * h/g | Q, % |
|---|---|---|---|---|
| 1-ий | 3 | 1328 | 1347 | 98.6 |
| 100-ий | 3 | 1152 | 1186 | 97.1 |

Example 3. To determine the "relaxation recovery effect" of the cathode material intermittent galvanostatic titration was performed on a cathode made according to Example 1. The power source was discharged to a certain potential and then left unplugged for 5 hours. Then again discharged under the previous conditions. In the future, several more digit stages were carried out under the same scheme. In the first step, the load cut-off potential was 1.7 V, and after each relaxation step it decreased in 0.1 V increments. Comparison of the discharge curves, showed that the current source capacity at galvanostatic titration reaches 3900 mAh/g, while the ordinary discharge provides a capacity of only 2700 mAh/g. That is, due to the "relaxation recovery effect" of the cathode material, there is an increase in the capacity by 44% in the titration mode.

Example 4. The biological material was used as the active additive of the electrode composite of the supercapacitor. To perform the comparison and evaluation of the effectiveness of the biological material highly porous carbon material (C42) was used as a control (basic) working material for the electrode. A close analog of the symmetrical supercapacitor was a two-electrode stainless steel capacitor type. The electrodes were prepared by crimping a mixture of highly porous carbon material (C42) and acetylene carbon black in a 3:1 ratio, respectively. An aqueous solution of 3.5 M KOH was used as the electrolyte. The layout of the symmetric supercapacitor was tested in galvanostatic mode in the voltage range 0-1 V at different values of the load current. The composite material, which included biological material and highly porous carbon material (C42) in a 1:1 ratio, was obtained by ultrasonic treatment for 1 h. Water was used as the solvent. Salts of biological material were dissolved in water and, together with peptide centers, were adsorbed into the pores of carbon. The composite mixture was air-dried for 48 hours at 55° C. The finished composite was made into electrodes that were incorporated into a prototype supercapacitor for testing in galvanostatic mode. Comparison of the calculated discharge capacity at different values of currents for the highly porous carbon material (C42)-based supercapacitor and the biological material/porous carbon material (C42) composite-based capacitor showed a positive contribution of the biological material to the process of accumulation of the capacitor. The average discharge capacity increased by 10 F/g.

Additional information on the electrochemical properties of the biomaterial-based cathode material was obtained by comparing the integral specific energy $$\left(W = \frac{\int I \cdot U(C)dC}{m \cdot t}\right)$$

characteristics, in particular the specific energy released during the discharge of the current source.

It is revealed that at a current of 0.1 mA the specific energy is about 1000 mW h/g, while at a current of 0.4 mA the specific energy is about −3400 mW h/g. At a relatively lower discharge current (I=0.1 mA), the electrochemical processes at the cathode occur with the preservation of thermodynamic equilibrium without sudden changes in potential and have sufficient time for the intercalation of metal ions, in particular Li+, into the structure of the cathode material. This is accompanied by the equilibrium flow of redox processes without the accumulation of excess charge on the cathode. An increase in the discharge current will cause an increase in the charge density and its accumulation on the surface of the cathode material. In this case, the reduction of the cathode potential occurs without the intercalation of metal ions, in particular Li+ into the structure of the cathode material, and the redox processes occur only in the surface layers of the material. However, it should be noted that in the cathode material the proportion of biomaterial, as an electrochemically active substance, for which the peptides stand, is not more than 10%. In view of this, as well as the addition of acetylene carbon black and polyvinylidene fluoride to the cathode material, it is safe to say that, in terms of the active mass of the substance, the specific discharge capacity at given currents can increase by about an order of magnitude.

Example 5. As a result of studies of current sources with a cathode based on biomaterials in different modes of operation at discharge up to 1V at a relative load current $I_{disch}/m_{cathode}$=0.1 mA/g ($m_{cathode}$=5 mg) maximum capacity is 3900 mA h/g and specific energy is 4400 W·h/g (FIG. 3). The obtained results exceed the parameters of the available current sources and significantly exceed the parameters of the Li-ion sources of high energy current. That is, the possibility of using organic biological material as the active component of the cathode material for current sources has been confirmed.

The invention disclosed herein provides efficient operation of permanent and/or renewable current sources and/or energy storage units with high specific capacitance values, ability to store high discharge and charge capacities, with a large number of discharge cycles, has sufficient potential to significantly exceed all of the above indicators and has good prospects for use in many industries where current sources are used.

I claim:

1. A cathode material comprising an active component an organic biomaterial, acetylene carbon black, and optionally polyvinylidene fluoride, wherein the amount of the organic biomaterial ranges from 40 to 85 wt % of the total cathode material, the amount of acetylene carbon black ranges from 15-35 wt % of the total cathode material, and the polyvinylidene fluoride is present in an amount wherein the combined amount for the organic biomaterial, the acetylene carbon black, and the polyvinylidene fluoride is equal to 100 wt % of the total cathode material; and wherein the organic biomaterial comprises peptides of plant or animal origin in an amount of between 0.1 to 50 wt % of the total organic biomaterial and, in equal proportions by wt %, NaCl and $K_2HPO_4$ in an amount wherein the combined peptides of plant or animal origin and the NaCl and $K_2HPO_4$ equals 100 wt % of the total organic biomaterial.

2. The cathode material of claim 1, wherein the peptides of plant or animal origin comprise peptides ranging in molecular weight from 1 to 150 kDa.

3. The cathode material of claim 2, wherein the peptides have a primary sequence of 2 to 200 amino acids.

4. The cathode material of claim 1, wherein the organic biomaterial is present in an amount of about 77 wt %, the acetylene carbon black is present in an amount of about 18 wt %, and the polyvinylidene fluoride is present in an amount of about 5 wt %.

5. A cathode material comprising an organic biomaterial ranging from 40 to 85 wt % of the total cathode material, wherein the organic biomaterial comprises peptides of plant or animal origin, wherein the organic biomaterial comprises 0.1 to 50 wt % peptides of plant or animal origin ranging in molecular weight from 1 to 150 kDa.

6. The cathode material of claim 5, wherein the peptides have a primary sequence of 2 to 200 amino acids.

7. A cathode material comprising an organic biomaterial ranging from 40 to 85 wt % of the total cathode material, wherein the organic biomaterial comprises peptides of plant or animal origin, wherein the organic biomaterial further comprises NaCl and $K_2HPO_4$ in an amount wherein the combined peptides of plant or animal origin and the NaCl and $K_2HPO_4$ equals 100 wt % of the total organic biomaterial.

8. The cathode material of claim 5, further comprising a conductive component.

9. The cathode material of claim 8, wherein the conductive component comprises acetylene carbon black.

10. The cathode material of claim 9, wherein the acetylene carbon black ranges from 15 to 35 wt % of the total cathode material.

11. The cathode material of claim 5, further comprising a connecting component.

12. The cathode material of claim 11, wherein the connecting component comprises polyvinylidene fluoride.

13. The cathode material of claim 12, wherein the polyvinylidene fluoride is present in an amount of about 5 wt % of the total cathode material composition.

14. The cathode material of claim 7, further comprising a conductive component.

15. The cathode material of claim 14, wherein the conductive component comprises acetylene carbon black.

16. The cathode material of claim 15, wherein the acetylene carbon black ranges from 15 to 35 wt % of the total cathode material.

17. The cathode material of claim 7, further comprising a connecting component.

18. The cathode material of claim 17, wherein the connecting component comprises polyvinylidene fluoride.

19. The cathode material of claim 18, wherein the polyvinylidene fluoride is present in an amount of about 5 wt % of the total cathode material composition.

* * * * *